Dec. 21, 1937.  D. BROWN  2,102,584
AUTOMATIC PROPORTIONING DEVICE
Filed July 1, 1936   5 Sheets-Sheet 1

INVENTOR.
Davis Brown
BY Lyon & Lyon
ATTORNEYS

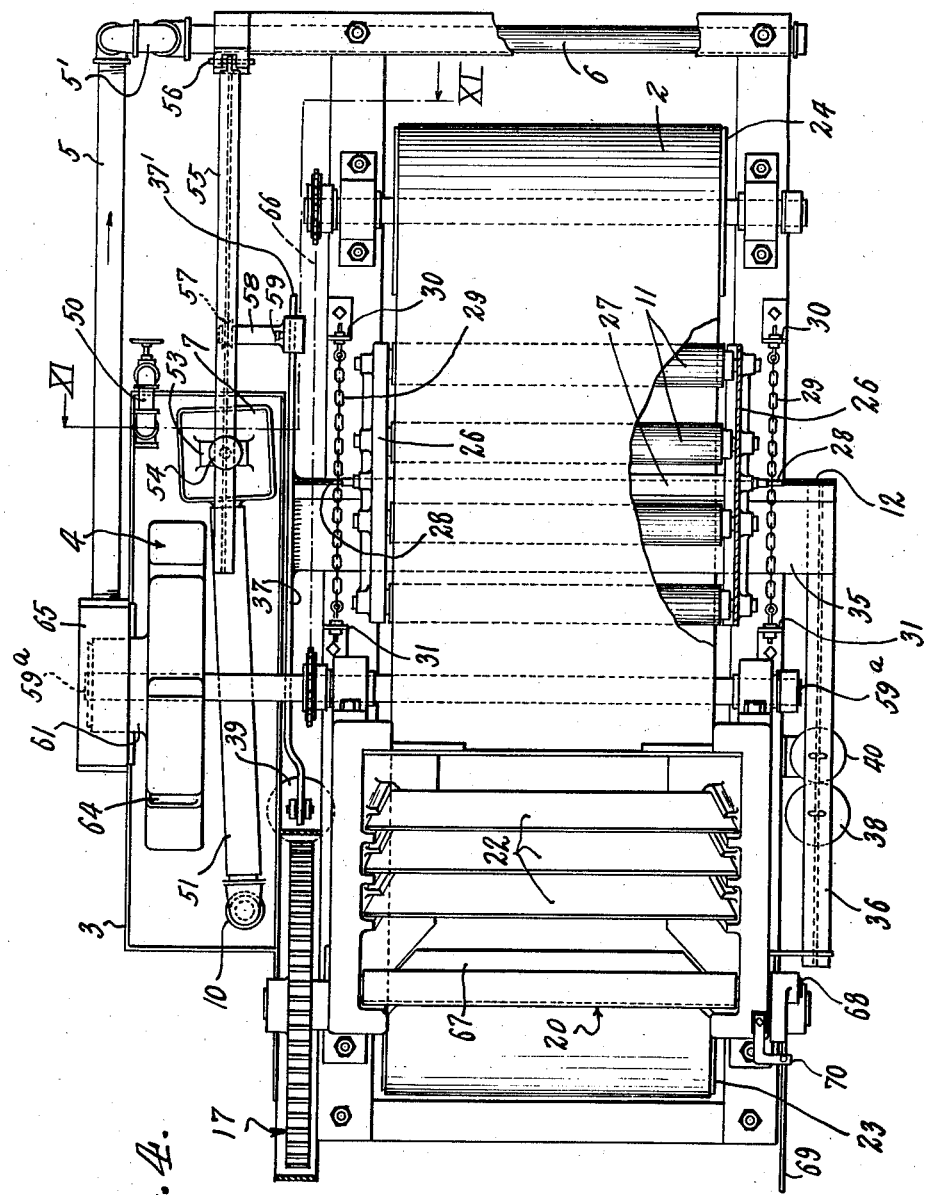

Dec. 21, 1937.                    D. BROWN                    2,102,584
                         AUTOMATIC PROPORTIONING DEVICE
                            Filed July 1, 1936          5 Sheets-Sheet 3

INVENTOR.
Davis Brown
BY Lyon & Lyon
ATTORNEYS

Dec. 21, 1937.  D. BROWN  2,102,584
AUTOMATIC PROPORTIONING DEVICE
Filed July 1, 1936  5 Sheets-Sheet 5
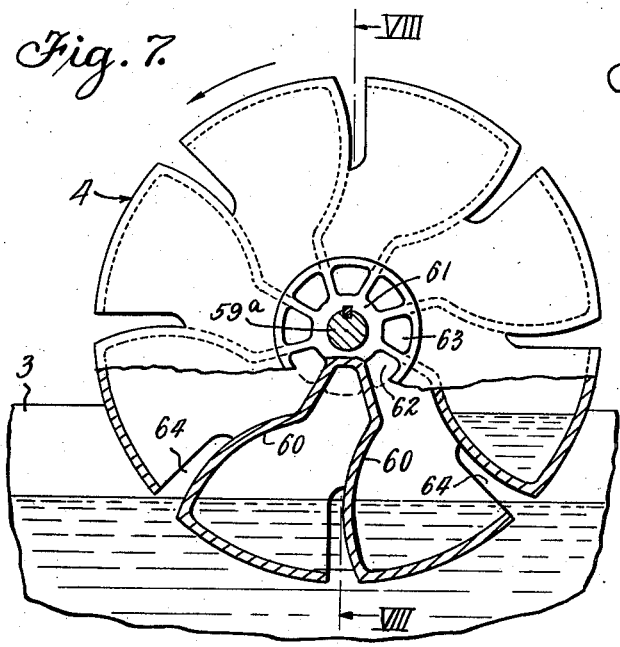
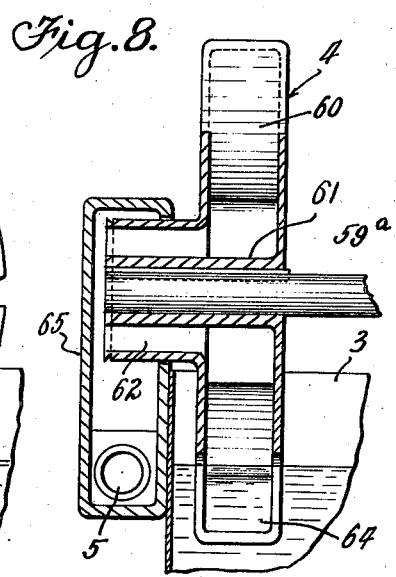
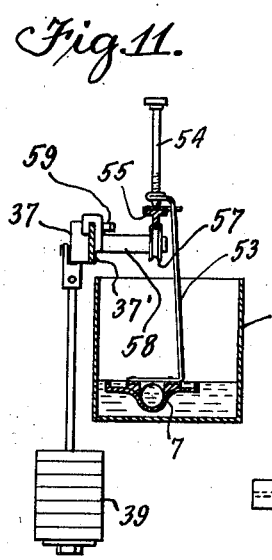
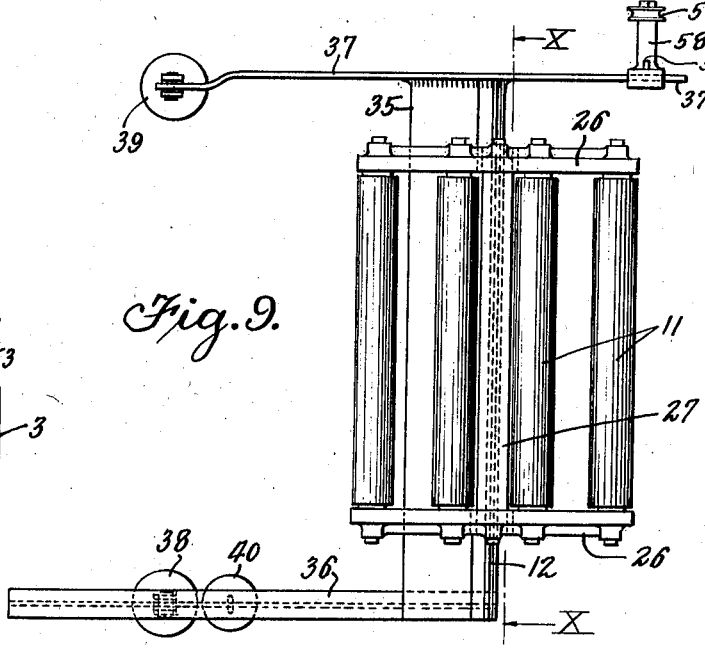
INVENTOR.
Davis Brown
BY Lyon & Lyon
ATTORNEYS Patented Dec. 21, 1937

2,102,584

UNITED STATES PATENT OFFICE 2,102,584

AUTOMATIC PROPORTIONING DEVICE

Davis Brown, Los Angeles, Calif.

Application July 1, 1936, Serial No. 88,390

9 Claims. (Cl. 221—96)

This invention relates to devices and methods whereby a liquid may be automatically proportioned to the volume of comminuted, ground, pulverized or other finely divided or crushed material. Furthermore, the invention relates to means and methods whereby the amount of liquid being proportioned is automatically varied in accordance with the apparent density and/or moisture content of the crushed or pulverized material. In addition, the proportioning devices and methods of this invention may be continuous in operation and the speed thereof may be increased or decreased in accordance with the requirements of the process or plant in which they are used.

Although the inventions are adapted for many industrial uses, they will be described more particularly in their relation to the clay and pottery practice. In the manufacture of clay products including brick, sewer pipe, earthenware, hotel china, etc., large quantities of clay or mixtures of materials containing clay are employed. These materials are generally reduced to a state of fine division by grinding the material and the finely divided material is then mixed with water to form a plastic mass capable of either being pressed, extruded or otherwise molded into the desired object. The embodiments of this invention described in detail hereinafter are particularly adapted for use in such instances and permit the amount of water to be carefully and accurately proportioned in a continuous and automatic manner. In accomplishing this result the device embodies a continuous belt conveyor to which the finely divided material or clay is fed through a feeding hopper having an outlet of predetermined cross sectional area. The belt conveyor moves the clay toward a mixing device or pug mill at any given rate. Feed of clay is therefore on a volumetric basis. The water supplying device is operated simultaneously and its speed is varied in accordance with the variations in speed of the conveyor belt. As a further refinement, changes in moisture content of the clay being fed by the conveyor are automatically noted and means are provided whereby the quantity of water being added to the mixer will vary in accordance with the variations in moisture content of the clay. In other words, if the clay is wet, a given volume thereof will weigh more and a smaller quantity of water is then added by the water feeding device per volume of clay. In the event the clay is dry, its weight per unit volume is low and a larger quantity of water is then supplied by the device. Some clays when in finely divided form and mixed before measurement, will be found to weigh more per cubic foot while dry than when in moist condition.

Moreover, the invention contemplates a feeding hopper which sustains the weight of clay from a bin leading into the hopper and automatically disconnects the entire proportioning device in the event bridging occurs in the bin or the supply of clay is discontinued for any other reason.

An object of this invention, therefore, is to disclose and provide an automatic means whereby a finely divided solid and a liquid may be automatically proportioned and supplied to a suitable mixer, pug mill or the like.

Another obect of the invention is to disclose and provide a device adapted to volumetrically feed finely divided material to a mixer and simultaneously and proportionately feed a liquid to said mixer.

Another object of the invention is to disclose and provide means for automatically proportioning finely divided materials and liquids and supply the same to a mixer, the amount of liquid being added and proportioned being automatically varied in accordance with the moisture content and/or specific gravity of the finely divided material.

A still further object of the invention is to disclose and provide a feeding hopper capable of sustaining the weight of an appreciable height of finely divided material so as to deliver said material to a conveyor in a loose, uncompacted form and to substantially eliminate variations in degree of compactness.

These and other objects, uses and advantages of the invention will become apparent to those skilled in the art from the following detailed description of preferred embodiments of the invention.

For purposes of illustration, reference will be had to the appended drawings, in which:

Fig. 4 is an enlarged plan view of an arrangement of elements similar to that shown in Fig. 2.

Fig. 5 is a side elevation, partly in section, of the device shown in Fig. 4.

Fig. 7 is an enlarged side elevation, partly broken away, of the water feeding device.

Fig. 8 is a vertical section taken along the plane VIII—VIII of Fig. 7.

Fig. 9 is an enlarged view of a portion of the device employed in automatically controlling addition of a liquid in accordance with the moisture content of the finely divided material being fed.

Fig. 11 is a vertical section through the liquid tank and adjustable overflow, the section being taken more or less along the plane XI—XI of Fig. 4.

Figure 1:
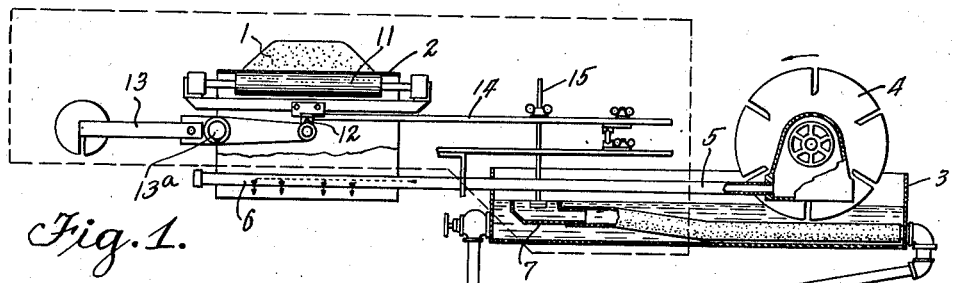
Fig. 1 is a diagrammatic representation of one arrangement.

The schematic representation shown in Fig. 1 is for the purpose of simplifying subsequent description of a more detailed machine. As shown in Fig. 1, a finely divided material 1 is continuously advanced by a conveyor belt 2 toward a suitable mixer. The material 1 is volumetrically measured, the conveyor 2 feeding the material to the mixer at a predetermined volumetric rate which obviously can be readily interpreted or computed in gravimetric units. A liquid from the tank 3 is picked up by means of a rotating feeder 4 through apertures or inlets formed in the periphery of the wheel 4 and discharged through a hollow trunnion into the line 5 which then permits the liquid to be supplied and mixed with the material in the mixing device (not shown) by means of the spray head 6.

The liquid level in the tank 3 is maintained substantially uniform by means of an overflow device 7. An excessive amount of liquid is supplied from the reservoir 8 to the tank 3 by means of a pump 9, the overflow passing by means of the return line 10 back into the reservoir. A section of the conveyor 2 passes over a set of rolls 11 which are supported on a knife edge 12, the knife edge being carried by a beam 13 pivoted at 13a. As the unit volume of material 1 passing over the rollers 11 varies in weight, the rollers and their carriage will move up or down, depending upon the variation in the weight of material carried thereby, this up and down movement of the rollers 11 and their carriage being transmitted by means of a rod 14 and an adjustable member 15 to the overflow device 7, the member 15 being attached to the overflow device. In this manner in the event the material 1 passing over the rollers 11 is extremely dry and low in weight per unit volume, the rollers 11 will rise, thereby raising the rod 14 and the overflow device 7, causing the liquid level in the tank 3 to rise, which in turn permits the wheel 4 to pick up more liquid and to supply more liquid to the mixing device so as to compensate for the lower moisture content of the material 1.

The more specific embodiments of the invention are shown in the succeeding drawings. As shown in these drawings, the feeding hopper 20 is supplied with finely divided, crushed, granular or other material from a bin 21, the feeding hopper discharging upon the continuous belt conveyor 2. The mixing device is illustrated at 19 and is supplied with the finely divided material 1 by such continuous conveyor. The conveyor 2 is driven by means of a variable speed motor 16 and gearing 17. The liquid feeder 4 is driven from the conveyor roll 18, the opposite conveyor roll being driven by the variable speed motor 16.

Figure 3:
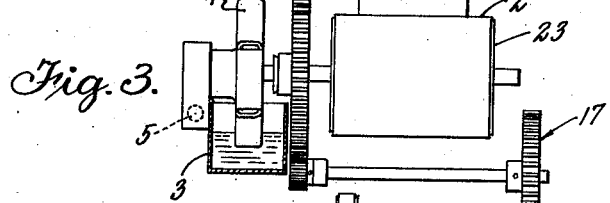
Fig. 3 is an end view, partly in section, of the arrangement shown in Fig. 2.
Figure 2:
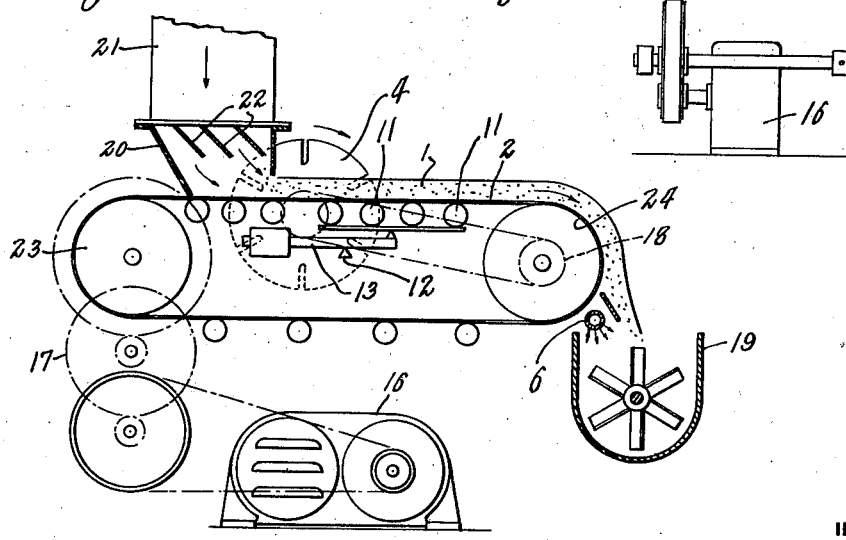
Fig. 2 is a diagrammatic representation of another arrangement of elements.
Figure 6:
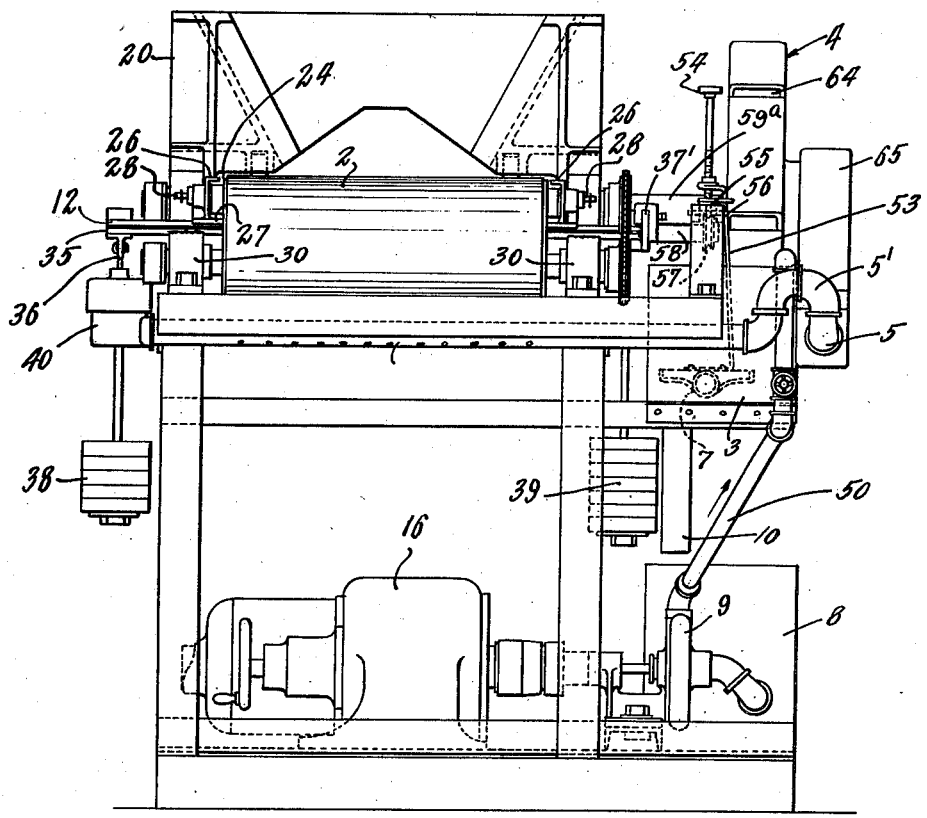
Fig. 6 is an end view of the device shown in Figs. 4 and 5.
Figure 10:
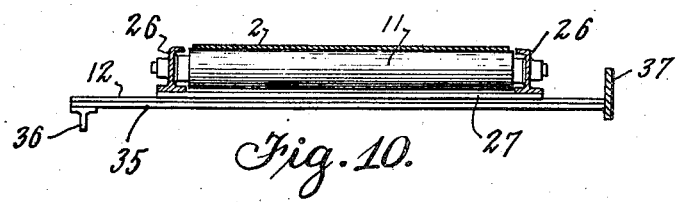
Fig. 10 is a vertical section taken along the plane X—X of Fig. 9.

In Fig. 2 the rollers 11 are shown yieldably urged by means of the counterbalanced beam 13. The general arrangement of elements will be evident from Figs. 2 and 3. Details of construction will be understood from a consideration of the more detailed drawings, such as Figs. 4, 5 and 6.

The feeding hopper 20 is preferably provided with a plurality of inclined removable baffles 22 which are positioned at an angle, the angle being substantially the same as the natural angle of repose of the finely divided material passing through said feeding hopper and supplied thereto from the bin 21. The baffles 22 as shown may be positioned in a horizontal row substantially parallel to the plane of the conveyor 2. These baffles are of such height that vertical downward thrust from the material in bin 21 does not fall directly upon conveyor 2, the upper edges of the baffles slightly overlapping the vertical projections of the lower edges.

The bottom of the feeding hopper 20 is preferably closely adjacent to the continuous belt conveyor 2 and the front of said hopper is provided with an outlet of predetermined cross-sectional area so that a given volume of finely divided material will be fed upon every lineal foot of the belt conveyor 2. In the event a considerable height of comminuted material, such as clay, exists in the bin 21, there is a tendency for such clay to become compacted at the bottom of the bin and in the feeding hopper, thereby materially affecting the density of the clay supplied to the conveyor 2. The baffles 22 carry the load of this overlying height of clay and supply the clay in relatively uncompacted and uniform condition to the belt 2 irrespective of the height of material in the bin 21.

The conveyor 2 is shown mounted upon a rear roller 23 and a front feeding roller 24. The rear roller is driven through the gear train 17 from the variable speed motor 16. The motor, gearing, rollers 23 and 24 and other portions of the device may be mounted upon a suitable bed frame. The upper lay of the conveyor belt 2 passes over a plurality of idler rollers, such as the rollers 25. A given length of the belt 2 is supported by the rollers 11 which are journaled in a frame 26 provided with a flat connecting bar 27. The frame 26 may be provided with a pair of studs 28. These studs 28 fit into a ring or the link of a chain 29 attached to adjustably positionable angle irons 30 and 31, these angle irons being adjustably positionable on the frame of the machine. By means of the chains 29 and the angle irons 30 and 31 and their cooperation with the studs 28, the framework 26 carrying the rollers 11 may be suitably positioned without restricting vertical motion of the frame, since the chains 29 are left relatively loose.

Extending transversely of the machine and carried thereby is the member 33 provided with a vertical fixed knife edge 34. This knife edge bears against a transverse plate 35 connecting side beams 36 and 37. The side beam 36 may be a T bar. The plate 35 has an upstanding knife edge 12 adapted to rest directly against a transverse flat 27 connecting the end pieces of the carriage 26.

The end of beam 36 is provided with a counterweight 38 whereas the end of the beam 37 is provided with a similar counterweight 39. Moreover, a suitable dash pot 40 may be connected to the beam 36. From the description given hereinabove, it will be evident that as the weight of clay carried by the belt 2 and passing over the rollers 11 in the frame 26 is varied, such carriage 26 will be raised or lowered, pivoting about the knife edge resting against the flat connecting member 27 and the knife edge 34.

To the side of the conveyor belt 2 is a tank 3 which is supplied with liquid through the valved inlet line 50. The inlet line 50 is supplied with liquid from a reservoir 8 by means of a pump 9. The tank 3 is provided with an overflow device 7 connected by means of a flexible rubber hose 51 with a return line 10 leading back to the reservoir 8. The overflow device 7 is supported upon an arm 53 threadedly connected to an adjustment bolt 54 carried upon an arm 55 horizontally pivoted as at 56. The arm 55 rests upon a sheave 57 mounted upon a stud 58 which is adjustably positionable as by means of a locking screw 59 upon a forward extension 37' of the member 37.

It will be evident that in the event the carriage 26 is raised or lowered due to variations in moisture content of clay passing over the rollers 11, the beam 37 will change in its angular position with respect to the horizontal and the sheave 57 carried by the stud 58 mounted upon the extension 37' of the beam 37 will raise or lower the member 55, thereby raising and lowering the float device 7 within the tank 3. The water level within the tank 3 will thus be automatically varied in accordance with the moisture content of the material passing over the rollers 11.

It is to be remembered that the pump 9 supplies an excessive quantity of water or other liquid to the tank 3 so that the change in water level within the tank may be readily and quickly attained.

Mounted upon a shaft 59a is a water-feeding device, generally indicated by the numeral 4. This device comprises a hollow wheel having substantially radial partitions 60 therein, these partitions leading to the hub 61. A plurality of ports 62, 63, and the like, is arranged around the hub, these outlet ports being separated by continuations of the radial partitions 60. The water wheel 4 is provided with substantially radially extending inlet ports 64 which adjoin the partitions 60. The circumferential portions of the wheel 4 form pockets or buckets so that when the water wheel 4 is rotated in the direction of the arrow (Fig. 7) and its rim extends beneath the water level in the tank 3, water enters through the inlet ports 64 and is caught in the buckets thus formed, further rotation of the wheel causing the buckets to empty through the outlet ports 62 and 63 which are substantially axially arranged. These ports empty into a housing 65, the housing 65 being then connected by means of the line 5 with the manifold 6, it being understood that this manifold is positioned directly above the mixer, pug mill or other device to which the finely divided material and the liquid are being supplied in proportionate quantities.

A syphon connection 5' is shown between the lines 5 and 6 (Fig. 6) and such connection is preferably provided with a small vent hole near the top to prevent the syphon from acting in the event the machine is stopped.

The liquid feeding wheel 4 is mounted on the shaft 59a and is driven by means of suitable sprockets and chains, generally indicated at 66 (Fig. 4) from the conveyor roll 24. It is to be noted that this conveyor roll is not directly driven but is instead driven by the conveyor belt 2. In this manner any slippage between the driven conveyor roll 23 and the belt does not cause the water feeder 4 to supply excessive quantities of liquid.

The variable speed motor 16 drives both the conveyor and the pump 9. In the event the finely divided material being supplied from the bin 21 to the feeding hopper 20 is depleted or bridges in the bin so that it is not being supplied properly to the feeding hopper 20, means are provided whereby the movement of the conveyor and the supply of water is immediately discontinued. Such means include a baffle member 67 mounted upon a transverse rocker shaft 68 provided with an arm 69 which may be suitably counterbalanced.

When there is no material being fed from the bin 21 into the feeding hopper 20, the beam 69 will cause the baffle 67 to be raised, opening contact 70 which opens the circuit to the motor 16. When clay or other finely divided material is being effectively passed through the feeding hopper 20, the baffle 67 assumes the position shown in Fig. 5, the contact 70 being then closed and the motor 16 being adapted to operate. Obviously, in the event the bin 21 is depleted or bridging takes place so that finely divided material is not passing through the feeding hopper, the contact 70 is again opened, discontinuing the operation of the machine and thereby preventing excessive amounts of liquid to be supplied to the mixer without simultaneous supply of finely divided material.

In actual operation after preliminary adjustments have been made so that an approximate proportion of water is being supplied by the feeder 4 to the manifold 6, secondary adjustments can be made. Such secondary adjustments, for example, first comprise the manipulation of the thumb screw 54 so as to raise or lower the overflow device 7 to insure the presence of a desired water level in the tank 3. When appreciable and fairly rapid changes in moisture content of the clay being fed by conveyor 2 take place, then the rapidity with which the water level in the tank 3 can be simultaneously varied may be increased by adjusting the stub shaft 58 along the extension 37' of the beam 37 so as to cause the member 55 to pivot through a wider arc with even a minor change in the elevation of the carriage 26. It is to be remembered that the carriage 26 is responsive to variations in the weight of material passing over the frame 26 and rollers 11 and in the case of clay the moisture content is the main cause of such variation. The dash pot 40 acts as a shock absorber and smooths the operation of the device. The counterbalances or weights 38 are adjusted so as to maintain the frame 26 substantially in the plane of the belt 2 when finely divided material in normal condition is passing thereover. The conveyor belt 2 should not be too tight so as to permit upward and downward deflection at above the carriage 26.

As has been stated hereinbefore, the device described hereinabove is particularly adapted for use in plants handling large quantities of clay and other ceramic materials but it may also be adapted for use in plants wherever a liquid and a finely divided solid need be mixed in proportionate quantities. The illustrative form of device is particularly directed for use with those finely divided materials which weigh more per unit volume in the moist condition than in dry condition. In the event the machine is to be used on those materials which weigh more in dry form than in moist form, then the only change which need be made is that of location of the fulcrum points so that downward movement of the carriage 26 produces an upward movement of the overflow device 7. This can be readily accomplished by introducing a lever connection between the arm 53 and the end of arm member 55. In such case the arm 55 can be terminated at a point between the stud 58 and a point above the overflow device 7. All modifications and structures coming within the scope of the appended claims are embraced thereby.

I claim:

1. In a device of the character described, the combination of: a belt conveyor for continuously feeding comminuted material at a substantially uniform volumetric rate, a feeding hopper provided with an outlet of predetermined cross-sectional area adapted to supply comminuted material to said conveyor, liquid feeding means, pump means for supplying liquid to said liquid feeding means, drive means for simultaneously driving said conveyor and pump at uniform speeds, and means responsive to variations in weight of comminuted material carried by said conveyor for by-passing said liquid feeding means and varying the output of said liquid feeding means.

2. In a device of the character described, the combination of: a continuous belt conveyor, a feeding hopper positioned above said conveyor, said feeding hopper being provided with an outlet of predetermined cross-sectional area, a vertically movable table beneath a portion of the conveyor, means for yieldably urging said movable table upwardly, a liquid feeder including a tank, means for supplying liquid to said tank, an adjustably positionable overflow in said tank, and a rotatable bucket wheel partly immersed in liquid in said tank, means for collecting and discharging liquid picked up by said bucket wheel, and means connecting said movable table and overflow whereby said overflow is automatically raised and lowered in accordance with variations in weight of material carried by said conveyor over said table.

3. In a device of the character described, the combination of: a continuous belt conveyor, a feeding hopper provided with an outlet of predetermined cross-sectional area positioned above said belt, a movable table positioned below a portion of said conveyor belt, said table being provided with a plurality of rollers in contact with said belt, and a flat-faced member carried by the table, a pivoted beam provided with a knife edge, said knife edge being adapted to cooperate with said flat member, said beam being adapted to yieldably support the table and rollers in contact with said conveyor, a liquid feeding means including a tank for liquid, means for supplying liquid to said tank, and an overflow means for maintaining substantially uniform liquid level in said tank, and means operably connecting said overflow and pivoted beam for adjustably positioning said overflow in response to changes in position of said beam.

4. In a device of the character described, the combination of: a continuous belt conveyor, a feeding hopper provided with an outlet of predetermined cross-sectional area positioned above said belt, a movable table positioned below a portion of said conveyor belt, said table being provided with a plurality of rollers in contact with said belt, and a flat-faced member carried by the table, a pivoted beam provided with a knife edge, said knife edge being adapted to cooperate with said flat member, said beam being adapted to yieldably support the table and rollers in contact with said conveyor, a liquid feeding means including a tank for liquid, means for supplying liquid to said tank, and an overflow means for maintaining substantially uniform liquid level in said tank, means operably connecting said overflow and pivoted beam for adjustably positioning said overflow in response to changes in position of said beam, and separate means for variably adjusting the ratio of response of said overflow to a given change in the position of said beam.

5. In a device of the character described, the combination of: a continuous belt conveyor, a feeding hopper provided with an outlet of predetermined cross-sectional area positioned above said belt, a movable table positioned below a portion of said conveyor belt, said table being provided with a plurality of rollers in contact with said belt, and a flat-faced member carried by the table, a pivoted beam provided with a knife edge, said knife edge being adapted to cooperate with said flat member, said beam being adapted to yieldably support the table and rollers in contact with said conveyor, a liquid feeder including a tank, means for supplying liquid to said tank, an adjustably positionable overflow in said tank, a rotatable bucket wheel partly immersed in liquid in said tank, means for collecting and discharging liquid picked up by said bucket wheel, and means operably connecting said overflow and pivoted beam for adjustably positioning said overflow in response to changes in position of said beam.

6. In a device of the character described, the combination of: a continuous belt conveyor, a feeding hopper provided with an outlet of predetermined cross-sectional area positioned above said belt, a movable table positioned below a portion of said conveyor belt, said table being provided with a plurality of rollers in contact with said belt, and a flat-faced member carried by the table, a pivoted beam provided with a knife edge, said knife edge being adapted to cooperate with said flat member, said beam being adapted to yieldably support the table and rollers in contact with said conveyor, a liquid feeder including a tank, means for supplying liquid to said tank, an adjustably positionable overflow in said tank, a rotatable bucket wheel partly immersed in liquid in said tank, means for collecting and discharging liquid picked up by said bucket wheel, means operably connecting said overflow and pivoted beam for adjustably positioning said overflow in response to changes in position of said beam, and means for varying the ratio of response of said overflow to a given change in position of said beam.

7. In a device of the character described, the combination of: a continuous belt conveyor, a feeding hopper provided with an outlet of predetermined cross-sectional area positioned above said belt, a movable table positioned below a portion of said conveyor belt, said table being provided with a plurality of rollers in contact with said belt, and a flat-faced member carried by the table, a pivoted beam provided with a knife edge, said knife edge being adapted to cooperate with said flat member, said beam being adapted to yieldably support the table and rollers in contact with said conveyor, a liquid feeder including a tank, pump means for supplying liquid to said tank, an adjustably positionable overflow in said tank, a rotatable bucket wheel partly immersed in liquid in said tank, means for collecting and discharging liquid picked up by said bucket wheel, means operably connecting said overflow and pivoted beam for adjustably positioning said overflow in response to changes in position of said beam, motor means for driving said conveyor, bucket wheel and pump, and means positioned in the feeding hopper for automatically disconnecting said motor means when finely divided material is not passing through said hopper.

8. In a device of the character described, the combination of: a continuous belt conveyor, a feeding hopper positioned above said conveyor, said feeding hopper being provided with an outlet of predetermined cross-sectional area, a vertically movable table beneath a portion of the conveyor, means for yieldably urging said movable table upwardly; a liquid feeder including a tank, means for supplying liquid to said tank, an adjustably positionable overflow in said tank, a rotatable bucket wheel partly immersed in liquid in said tank, means for collecting and discharging liquid picked up by said bucket wheel; means for driving said conveyor and bucket wheel at proportionate speeds; and means connecting said movable table and overflow whereby said overflow is automatically raised and lowered in accordance with variations in weight of material carried by said conveyor over said table to automatically vary the amount of liquid picked up and discharged by said bucket wheel.

9. In a device of the character described; the combination of: a belt conveyor for continuously feeding comminuted material at a uniform volumetric rate; a feeding hopper provided with an outlet of predetermined cross-sectional area adapted to supply comminuted material to said conveyor, a plurality of horizontally disposed parallel baffles across said hopper spaced from the plane of said conveyor and above said hopper outlet, said baffles being inclined at substantially the natural angle of repose of material in said hopper; liquid feeding means, pump means for supplying liquid to said liquid feeding means, driving means for simultaneously driving said conveyor and pump at uniform speeds, and means responsive to variations in weight of comminuted material carried by a fixed length of said conveyor for by-passing said liquid feeding means and varying the output of said liquid feeding means.

DAVIS BROWN.